(12) United States Patent
Pasula

(10) Patent No.: US 9,204,205 B1
(45) Date of Patent: Dec. 1, 2015

(54) VIEWING ADVERTISEMENTS USING AN ADVERTISEMENT QUEUE

(71) Applicant: Ravi Kiran Pasula, San Jose, CA (US)

(72) Inventor: Ravi Kiran Pasula, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 38 days.

(21) Appl. No.: 13/907,739

(22) Filed: May 31, 2013

(51) Int. Cl.
  *H04N 21/45*   (2011.01)
  *H04N 21/81*   (2011.01)
  *G06Q 30/02*   (2012.01)
  *H04N 21/458*  (2011.01)

(52) U.S. Cl.
  CPC ......... *H04N 21/812* (2013.01); *G06Q 30/0257* (2013.01); *H04N 21/458* (2013.01); *H04N 21/4532* (2013.01)

(58) Field of Classification Search
  None
  See application file for complete search history.

(56) References Cited

U.S. PATENT DOCUMENTS

| | | | |
|---|---|---|---|
| 2002/0162115 A1* | 10/2002 | Bruckner et al. | 725/105 |
| 2002/0178445 A1* | 11/2002 | Eldering et al. | 725/32 |
| 2004/0015994 A1* | 1/2004 | Choi et al. | 725/87 |
| 2006/0075449 A1* | 4/2006 | Jagadeesan et al. | 725/113 |
| 2007/0157228 A1* | 7/2007 | Bayer et al. | 725/34 |
| 2008/0115161 A1* | 5/2008 | Kurzion | 725/32 |
| 2008/0276269 A1* | 11/2008 | Miller et al. | 725/34 |
| 2009/0210899 A1* | 8/2009 | Lawrence-Apfelbaum et al. | 725/34 |
| 2011/0231868 A1* | 9/2011 | Martens | 725/13 |
| 2012/0110616 A1* | 5/2012 | Kilar et al. | 725/32 |
| 2013/0152125 A1* | 6/2013 | Xiong et al. | 725/34 |

* cited by examiner

*Primary Examiner* — Robert Hance
(74) *Attorney, Agent, or Firm* — Osha Liang LLP

(57) ABSTRACT

Embodiments of the invention provides an advertisement queue (ADQ) allowing users (i.e., potential advertisement viewers) to temporarily store a limited number of electronic advertisements for later viewing as an alternative to completely dismissing all advertisements as irrelevant. For example, the electronic advertisements include, but not limited to, online advertisements and television advertisements. In one or more embodiments, a user's ADQ is allocated to store a maximum number of advertisements, referred to as queued advertisements. When the ADQ is full or reaches a pre-determined percentage of maximum entry count, the user is offered to view a queued advertisement in the ADQ, to select a category of advertisement for future queuing, and/or to clear the ADQ.

17 Claims, 7 Drawing Sheets

VIEWING ADVERTISEMENTS USING AN ADVERTISEMENT QUEUE

BACKGROUND

Electronic media audiences (e.g., Internet users, TV viewers, etc.) have generally become insensitive to electronic advertisements, such as online advertisements, TV advertisements, etc. Media advertisements in general, and electronic advertisements in particular, are perceived by media audiences as mostly irrelevant and therefore treated as noise, resulting in a loss to the businesses placing the advertisements.

SUMMARY

In general, in one aspect, the invention relates to a method to present advertisements. The method includes identifying a user queuing selection of a first advertisement, wherein the user queuing selection is made by a user while viewing an icon representing the first advertisement on a user device, queuing, by a computer processor and in response to the user queuing selection, the first advertisement in an advertisement queue (ADQ) assigned to the user, wherein the ADQ comprises a plurality of advertisements that were previously selected to be queued by the user, presenting, in response to the ADQ reaching a pre-determined full-status, a notification to the user inviting the user to view one or more advertisements queued in the ADQ, identifying, in response to the notification, a user viewing selection to select, from the ADQ, the first advertisement for viewing, and sending, by the computer processor and in response to the user viewing selection, an advertisement presentation request to present the first advertisement on the user device, wherein the advertisement presentation request requires payment of an advertising fee by an advertiser.

In general, in one aspect, the invention relates to a system to present advertisements, The system includes (i) a computer processor, (ii) a content server including the computer processor and configured to provide online content for user viewing, (iii) a user device coupled to the content server and configured to retrieve the online content for presenting to a user, wherein the user device includes an advertisement queue (ADQ) agent, executing as instructions on the computer processor, configured to identify a user queuing selection of a first advertisement, wherein the user queuing selection is made by a user while viewing an icon representing the first advertisement on the user device, present, in response to an ADQ assigned to the user reaching a pre-determined full-status, a notification to the user inviting the user to view one or more advertisements queued in the ADQ, and identify, in response to the notification, a user viewing selection of the user to select, from the ADQ, the first advertisement for viewing, and (iv) an ADQ server including an ADQ manager, executing as instructions on the computer processor, configured t queue, in response to the user queuing selection, the first advertisement in the ADQ, wherein the ADQ comprises a plurality of advertisements that were previously selected to be queued by the user, and send, in response to the user viewing selection, an advertisement presentation request to an advertisement server to present the first advertisement to the user on the user device, and (v) a repository for storing the ADQ, wherein the advertisement server comprise the computer processor and is configured to receive the advertisement presentation request and present the first advertisement, and wherein the advertisement presentation request requires payment of an advertising fee by an advertiser.

In general, in one aspect, the invention relates to a non-transitory computer readable medium storing instructions to present advertisements, the instructions, when executed by a computer processor, comprising functionality for identifying a user queuing selection of a first advertisement, wherein the user queuing selection is made by a user while viewing an icon representing the first advertisement on a user device, queuing, in response to the user queuing selection, the first advertisement in an advertisement queue (ADQ) assigned to the user, wherein the ADQ comprises a plurality of advertisements that were previously selected to be queued by the user, presenting, in response to the ADQ reaching a pre-determined full-status, a notification to the user inviting the user to view one or more advertisements queued in the ADQ, identifying, in response to the notification, a user viewing selection to select, from the ADQ, the first advertisement for viewing, and sending, in response to the user viewing selection, an advertisement presentation request to present the first advertisement on the user device, wherein the advertisement presentation request requires payment of an advertising fee by an advertiser.

Other aspects of the invention will be apparent from the following detailed description and the appended claims.

DETAILED DESCRIPTION

Figure 1:
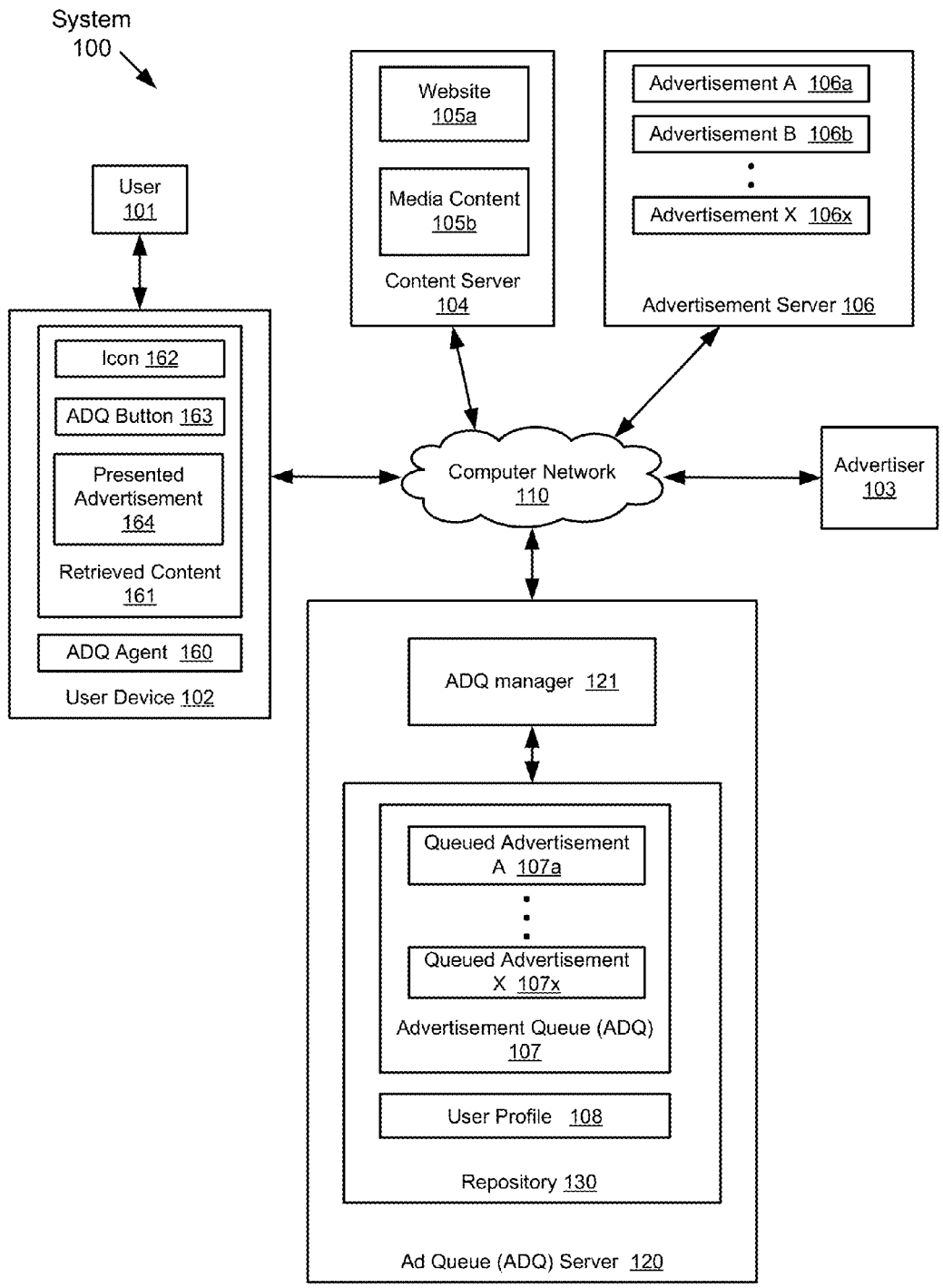
FIG. 1 shows a schematic diagram of a system of viewing advertisement using an advertisement queue in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provides an advertisement queue (ADQ) allowing users (i.e., potential advertisement viewers) to temporarily store a limited number of electronic advertisements for later viewing as an alternative to completely dismissing all advertisements as irrelevant. For example, the electronic advertisements include, but not limited to, online advertisements and television advertisements. In one or more embodiments, a user's ADQ is allocated to store a maximum number of advertisements, referred to as queued advertisements. When the ADQ is full or reaches a pre-determined percentage of maximum entry count, the user is offered to view a queued advertisement in the ADQ, to select a category of advertisement for future queuing, and/or to clear the ADQ.

In one or more embodiments, an advertiser is charged a different rate depending on the user's advertisement viewing behavior. For example, if the user views all of the queued advertisements in a row, indicating a casual viewing behavior, the advertiser is charged a lower rate. In contrast, the advertiser is charged a higher rate when the user selects a single advertisement to view and/or setting the category of the selected advertisements as a preferred category.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes a user device (102) used by a user (101), a content server (104), hosting a website (105a), and/or providing media content (105b), an advertisement server (106), and an advertisement queue (ADQ) server (120). In one or more embodiments of the invention, the user (101) is an individual, such as a consumer, who uses the user device (102) to view retrieved content (161) and is considered a potential advertisement viewer. In one or more embodiments, the retrieved content (161) corresponds to a webpage of the website (105a) hosted on the content server (104), which may be a web server. In one or more embodiments, the retrieved content (161) corresponds to media content (105b) (e.g., a streaming media file or a TV program) provided by the content server (104), which may be a streaming media server or a TV broadcasting station. In one or more embodiments of the invention, the advertiser (103) is a merchant or an advertising agency that uses the advertisement server (106) to place advertisements, such as one or more of the advertisement A (106a), advertisement B (106b), advertisement X (106x), etc. submitted to the advertisement server (106). In one or more embodiments of the invention, the retrieved content (161) is selectively inserted with an icon (162) representing one of the placed advertisements (e.g., advertisement A (106a), advertisement B (106b), advertisement X (106x)), an ADQ button (163) annotating the icon (162), and a presented advertisement (164), which is one of the placed advertisements selected by the user (101) for viewing. In one or more embodiments, inserting the icon (162), the ADQ button (163), and the presented advertisement (164) is controlled by the ADQ server (120) in conjunction with the content server (104) and the advertisement server (106).

In one or more embodiments of the invention, the content server (104), the advertisement server (106), and the ADQ server (120) are computing devices configured with computing and data storage functionalities. In one or more embodiments of the invention, portions of the content server (104), the advertisement server (106), and the ADQ server (120) are integrated or otherwise combined. In one or more embodiments of the invention, the user device (102) is a device configured with computing, data communication, and content display/playback functionalities. For example, the user device (102) may be a smartphone, tablet computer, notebook computer, desktop computer, game console, portable TV, Internet-connected TV set or other Internet-connected household appliances, etc.

Various components of the system (100) are coupled via a computer network (110). For example, the computer network (110) may include wired and/or wireless portions of public and/or private data network, such as wide area networks (WANs), local area networks (LANs), Internet, etc.

In one or more embodiments of the invention, the user device (102) includes the ADQ agent (160) that is configured to communicate with the ADQ server (120) to perform various functionalities of viewing advertisements using an advertisement queue (107). In one or more embodiments, the ADQ agent (160) is pre-installed on the user device (102). In one or more embodiments, the ADQ agent (160) is downloaded to execute on the user device (102). For example, the ADQ agent (160) may be downloaded from the advertisement server (106), the ADQ server (120), or the content server (104).

In one or more embodiments, the ADQ agent (160) is configured to identify a user queuing selection of an advertisement (e.g., advertisement A (106a)). Specifically, the user queuing selection is made by the user (101) while viewing the icon (162) on the user device (102). As noted above, the icon (162) is inserted in the retrieved content (161) to represent the advertisement A (106a). For example, the icon (162) may be a thumbnail representation of the advertisement A (106a). Generally, the user (101) either ignores the icon (162) entirely or views the advertisement A (106a) directly by clicking or mouse-over the icon (162). In one or more embodiments, as an alternative to ignoring the icon (162) or directly viewing the advertisement A (106a), the user (101) activates the ADQ button (163) annotating the icon (162) to select the advertisement A (106a) for later viewing. Such selection is referred to as the user queuing selection.

In one or more embodiments, the ADQ button (163) annotates the icon (162) using a user interface technique known to those skilled in the art. In one or more embodiments, the ADQ button (163) is adjacent to the icon (162) and pointing to the icon (162). In such embodiments, the user (101) activates the ADQ button (163) by clicking, mouse-over, or other user interface techniques. In one or more embodiments, the ADQ button (163) and the icon (162) are combined into a single user interface element. For example, the icon (162) is modified (e.g., shaded, colored, tilted, elongated, etc.) to form the single user interface element when combined with the ADQ button (163). In such embodiments, the user (101) applies different user interface actions to the combined single user interface element to activate the ADQ button (163) or to select the icon (162). For example, the user (101) may apply the clicking or mouse-over to select the icon (162) for directly viewing the advertisement A (106a). In another example, the user (101) may apply double clicking or pinching to activate the ADQ button (163) to generate the user queuing request. In one or more embodiments, the user queuing request causes the advertisement A (106a) to be added to an advertisement queue for later viewing. For example, the advertisement A (106a) may be added as the queued advertisement A (107a) to the ADQ (107), which is assigned to the user (101) by the ADQ server (120).

In one or more embodiments, the ADQ agent (160) is configured to present, in response to an ADQ (107) reaching a pre-determined full-status, a notification to the user (101). Specifically, the notification invites the user (101) to view one or more advertisements queued in the ADQ (107), such as the queued advertisement A (107a), queued advertisement X (107x), etc. In response, the user may decide to accept the invitation. For example, the user (101) may click an accept button embedded in the notification. In one or more embodiments, the ADQ agent (160) is configured to identify, in response to the notification, a user viewing selection of the user (101). For example, the user viewing selection may select, from the ADQ (107), the queued advertisement A (107a) for viewing. In one or more embodiments, the ADQ agent (160) identifies the user viewing selection by detecting the user (101) clicking the accept button embedded in the notification.

In one or more embodiments of the invention, the ADQ server (160) includes the ADQ manager (121) that is configured to receive, from the advertiser (103), a subscription to ADQ service (i.e., the service for queuing advertisements). In response, the ADQ server (160) sends an ADQ service request to the advertisement server (106). For example, the advertisement A (106a) is initially submitted to the advertisement server (106) by the advertiser (103). Accordingly, the subscription, and in turn the ADQ service request, identifies the advertisement A (106a) for the ADQ service.

In one or more embodiments, the ADQ manager (121) is configured to queue, in response to the user queuing selection, the advertisement A (106a) in the ADQ (107) as the queued advertisement A (107a). As shown in FIG. 1, the ADQ (107) stores a number of advertisements that were previously selected to be queued by the user (101). In one or more embodiments, the user queuing selection and the user viewing selection are associated with a user identifier of the user (101) and an advertisement identifier of the advertisement A (106a). Accordingly, the advertisement A (106a) is queued in the ADQ (107) by first identifying, based on the user identifier, which the ADQ (107) is assigned to the user (101). In one or more embodiments, the advertisement A (106a) is queued in the ADQ (107) by storing its advertisement identifier in the ADQ (107). As shown in FIG. 1, the advertisement identifier of the advertisement A (106a) is referred to as the queued advertisement A (107a) stored in the ADQ (107).

In one or more embodiments, the ADQ manager (121) is configured to send, in response to the user viewing selection, an advertisement presentation request to the advertisement server (106) to present the advertisement A (106a) to the user (101) on the user device (102). In response, the advertisement server (106), in conjunction with the content server (104), causes the advertisement A (106a) to be presented to the user (101) as the presented advertisement (164) in the retrieved content (161).

In one or more embodiments of the invention, the ADQ server (160) includes the repository (130) for storing the ADQ (107) described above and a user profile (108) of the user (101). In one or more embodiments, the repository (130) may include a disk drive storage device, a semiconductor storage device, other suitable computer data storage device, or combinations thereof.

In one or more embodiments, the user profile (108) includes user specific parameters, such as advertisement viewing pattern and preferred advertisement category of the user (101). In one or more embodiments, the ADQ manager (121) is configured to detect a viewing pattern of the user (101) viewing one or more advertisements queued in the ADQ (107). Accordingly, the viewing pattern, of the user (101), is stored in the user profile (108). In one or more embodiments, the ADQ manager (121) is configured to receive a preferred advertisement category of the user (101) and to generate, based on the preferred advertisement category, a ranking of advertisements queued in the ADQ (107). Accordingly, these advertisements are later presented to the user (101) based on such ranking.

In one or more embodiments of the invention, the advertisement server (106) is configured to receive the aforementioned advertisement presentation request and in response causing the advertisement A (106a) to be presented to the user (101). In one or more embodiments, the advertisement presentation request requires payment of an advertising fee by the advertiser (103). In one or more embodiments, the advertising fee is determined based on the advertisement viewing pattern, for example, retrieved from the user profile (108) of the user (101).

In one or more embodiments of the invention, the advertisement server (106) is configured to communicate with the content server (104) and cause the content server (104) to insert, in response to the aforementioned ADQ service request, the icon (162) in the retrieved content (161) to be viewed by the user (101). Further, the advertisement server (106) communicates with the content server (104) and cause the content server (104) to insert, in response to the aforementioned advertisement presentation request, the advertisement A (106a) as the presented advertisement (164) in the retrieved content (161) to be viewed by the user (101).

Figure 2:
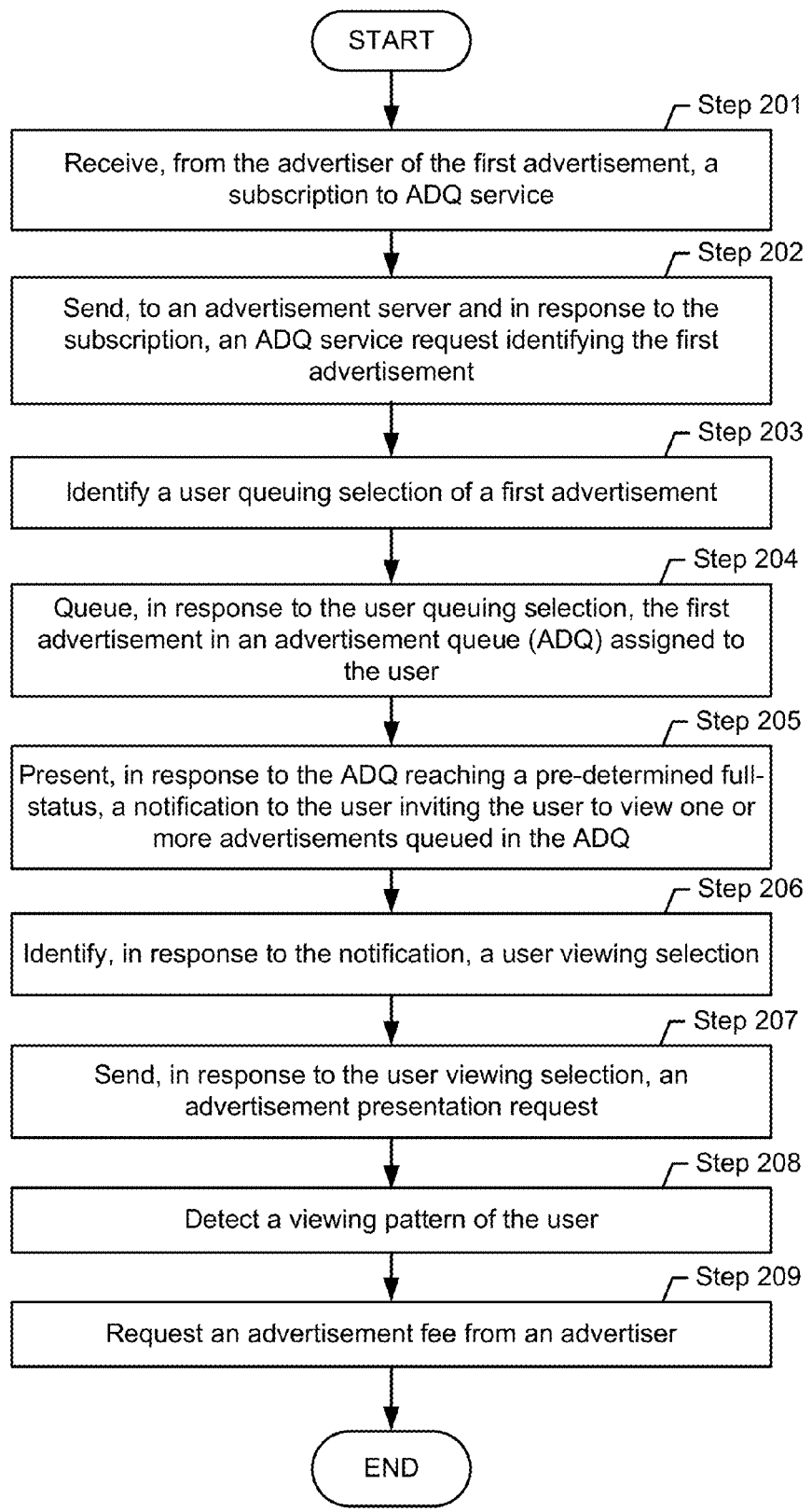
FIG. 2 shows a flowchart of a method of viewing advertisement using an advertisement queue in accordance in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100).

In one or more embodiments, the method steps shown in FIG. 2 provides a mechanism (referred to as ADQ service) allowing users (i.e., potential advertisement viewers) to temporarily store a limited number of electronic advertisements for later viewing, as an alternative to completely dismissing all advertisements as irrelevant. For example, the electronic advertisements include, but not limited to online advertisements and TV advertisements that are inserted into media content viewable on a smartphone, tablet computer, notebook computer, desktop computer, game console, portable TV, Internet-connected TV set or other Internet-connected household appliances, etc.

Initially in Step 201, a subscription to an ADQ service is received from an advertiser. The subscription specifies certain advertisements (referred to as qualifying advertisements) to be presented to potential viewers (i.e., users) with the queuing option.

In Step 202, in response to the subscription, an ADQ service request is sent to an advertisement server. In one or more embodiments, the advertisement server is operated by an advertisement agency partnering with a content provider. In one or more embodiments, the advertisement server is operated directly by the content provider, such as a website operator or a TV media company.

In one or more embodiments, the ADQ service request identifies one or more qualifying advertisements, such as an advertisement that has been submitted to the advertisement server for placement. In one or more embodiments, the advertisement server processes the ADQ service request and presents an icon representing the advertisement (referred to as the inserted advertisement) to the user on the user device. For example, the icon may be a thumbnail view representing the inserted advertisement and is inserted into the aforementioned media content. In one or more embodiments, the media content is provided to the user device by a content server. In particular, while presented to the user using the user device, the icon is annotated with an ADQ button.

In one or more embodiments, the ADQ button is separate from and associated with the icon. According, the user may select the icon to view the inserted advertisement or activates the ADQ button to queue the inserted advertisement for later viewing. In one or more embodiments, the ADQ button and the icon are combined into a single user interface element. According, the user may apply a particular pre-determined user interface action (e.g., clicking or mouse-over) to the single user interface element for selecting the icon or apply a different pre-determined user interface action (e.g., double clicking, pinching, or swiping) to the single user interface element for activating the ADQ button.

In one or more embodiments, activating the ADQ button generates a user queuing selection identifying the ADQ-button-annotated inserted advertisement to be queued for later viewing.

In Step 203, the user queuing selection of the ADQ-button-annotated inserted advertisement is identified. As noted above, the user queuing selection is made by the user activating the ADQ button while viewing the icon representing the inserted advertisement on the user device.

In Step 204, in response to the user queuing selection selecting the ADQ-button-annotated inserted advertisement, the ADQ-button-annotated inserted advertisement is queued in (i.e., added to) an advertisement queue (ADQ) assigned to the user. In particular, the ADQ stores advertisements that were previously selected to be queued by the user. In one or more embodiments, the user queuing selection is associated with a user identifier of the user and an advertisement identifier of the advertisement. According, queuing the ADQ-button-annotated inserted advertisement is by identifying the ADQ based on the user identifier and then storing the advertisement identifier in the ADQ assigned to the user.

In Step 205, in response to the ADQ reaching a pre-determined full-status, a notification is presented to the user inviting the user to view one or more advertisements queued in the ADQ. For example, the notification may be presented when the ADQ is completely full, or reaches a pre-determined fraction (e.g., 80%) of the maximum entry count of the ADQ. In one or more embodiments, the user has the option to ignore the notification, or to accept the invitation in the notification to select a queued advertisement for viewing. Accepting the invitation and making the selection generates a user viewing selection.

In Step 206, in response to the notification, the user viewing selection is identified to select, from the ADQ, a particular queued advertisement for viewing. In one or more embodiments, the user viewing selection is associated with the user identifier of the user and the advertisement identifier of the particular advertisement selected for viewing. Accordingly, in Step 207, in response to the user viewing selection, an advertisement presentation request is generated to present the particular advertisement for viewing on the user device. In one or more embodiments, the advertisement presentation request is sent to the aforementioned advertisement server, which communicates with the aforementioned content server and causes the content server to provide the full content of the particular advertisement to the user device for user viewing.

In one or more embodiments, generating and/or sending the advertisement presentation request requires payment of an advertising fee by the advertiser of the particular advertisement.

In one or more embodiments, the viewed advertisement is then removed from the ADQ. The user is also able to mark the viewed advertisement for repeated viewing, which may remain in the ADQ or be moved to a separate repeated viewing queue. Further, the user is allowed to set one or more preferred categories of advertisements for automatic inclusion in the ADQ or for prioritizing the queued advertisement for viewing. In one or more embodiments, the advertiser is provided information regarding the user's repeat viewing queue. Accordingly, the advertiser may offer a targeted promotion to the user. In one or more embodiments, the targeted promotion is presented to the user via the ADQ and/or the repeat viewing queue. In other words, the targeted promotion is presented along with content of the ADQ and/or the repeat viewing queue upon user viewing.

In Step 208, a viewing pattern is detected that represents a pattern of the user viewing the queued advertisements in the ADQ. In one or more embodiments, the advertising fee is determined based on the viewing pattern. In Step 209, a request is generated to request the advertising fee from the advertiser. Examples of the user viewing pattern and examples of determining advertising fee based on the viewing pattern are described in reference to FIGS. 3A-3D below.

FIGS. 3A-3D shows an application example in accordance with one or more embodiments of the invention. This application example may be practiced using the system (100) of FIG. 1 and based on the method described with respect to FIG. 2 above.

Figure 3A:
FIGS. 3A, 3B, 3C, and 3D show an example of viewing advertisement using an advertisement queue in accordance with one or more embodiments of the invention.

FIG. 3A shows a screenshot A (300) of a webpage of a website as viewed by a user. The webpage includes various online contents, such as news, games, mail, weather, etc. and is inserted with advertisements placed by merchants or advertisement agencies on behalf of the merchants. For example, the website operator may also act in the role of the advertisement agency. As shown in FIG. 3A, the inserted advertisements are in the icon form showing thumbnails of the complete advertisements, such as the advertisement icon A (301a) and advertisement icon B (301b). Generally, the user may click or mouse-over such icons and view the complete advertisement as a streaming video or audio message. Most of the time, however, users often simply ignore these inserted advertisements as irrelevant.

Further as shown in FIG. 3A, the advertisement icon A (301a) and advertisement icon B (301b) are annotated with the action button A (302a) and the action button B (302b), respectively. These action buttons allow the user an additional option to select one or more of the inserted advertisements for later viewing. For example, the website operator and/or the advertisement agencies have partnered with an advertisement queuing service provider to insert these annotated action buttons. Upon the user activating the action button A (302a), the screenshot A (300) is refreshed to present the user a different view, as depicted in FIG. 3B.

Figure 3B:
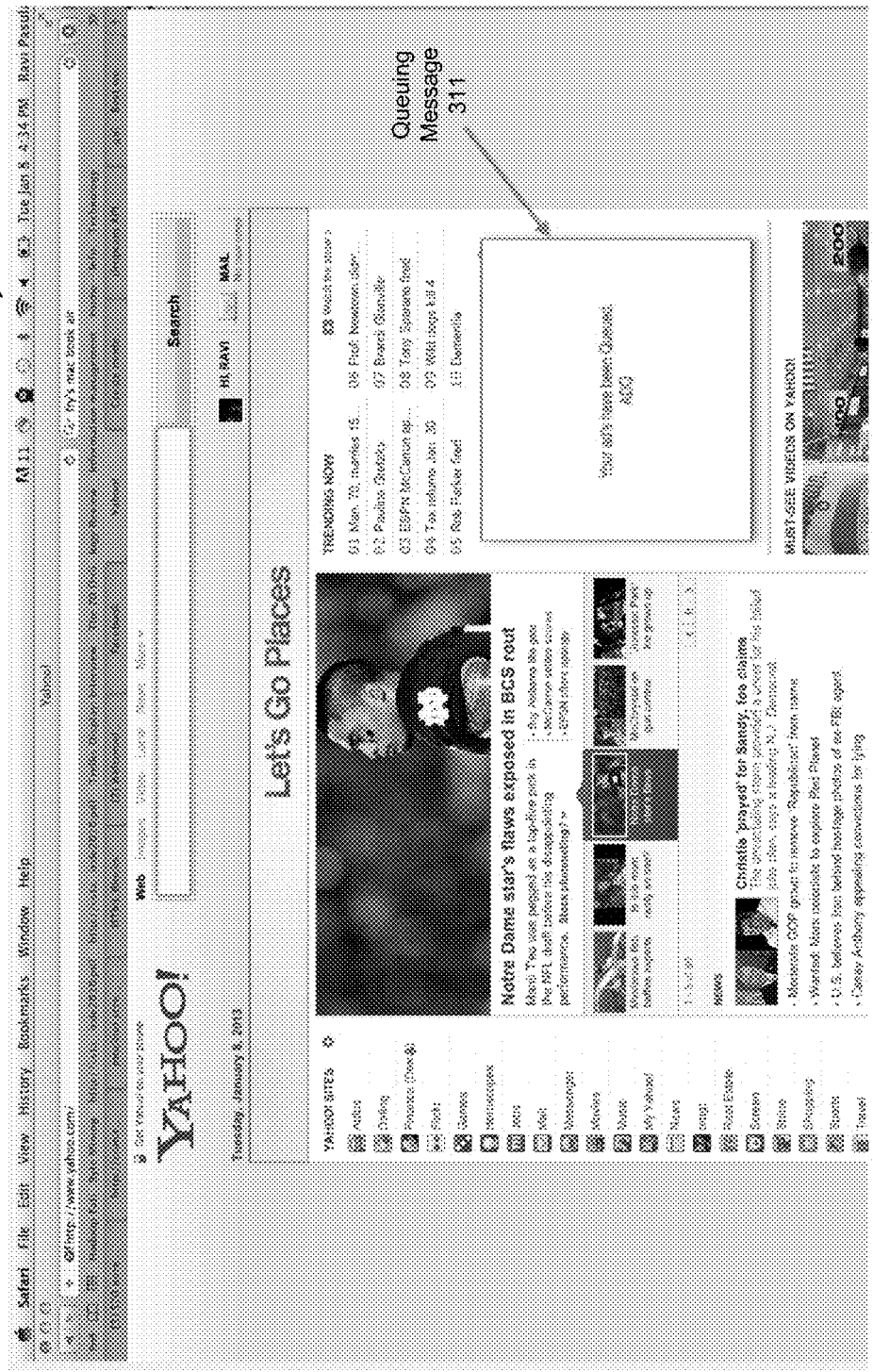

FIG. 3B shows a screenshot B (310) of the webpage shown in FIG. 3A after the user activates the action button A (302a). As shown in FIG. 3B, the advertisement icon A (301a) and the action button A (302a) are replaced by the queuing message (311) indicating that the inserted advertisement represented by the advertisement icon A (301a) has been queued. The user may view the content of the advertisement queue when the queue is full, or by clicking/mouse-over the queuing message (311) at any time. In either scenario, the screenshot B (310) is refreshed to present the user a different view, as depicted in FIG. 3C.

Figure 3C:
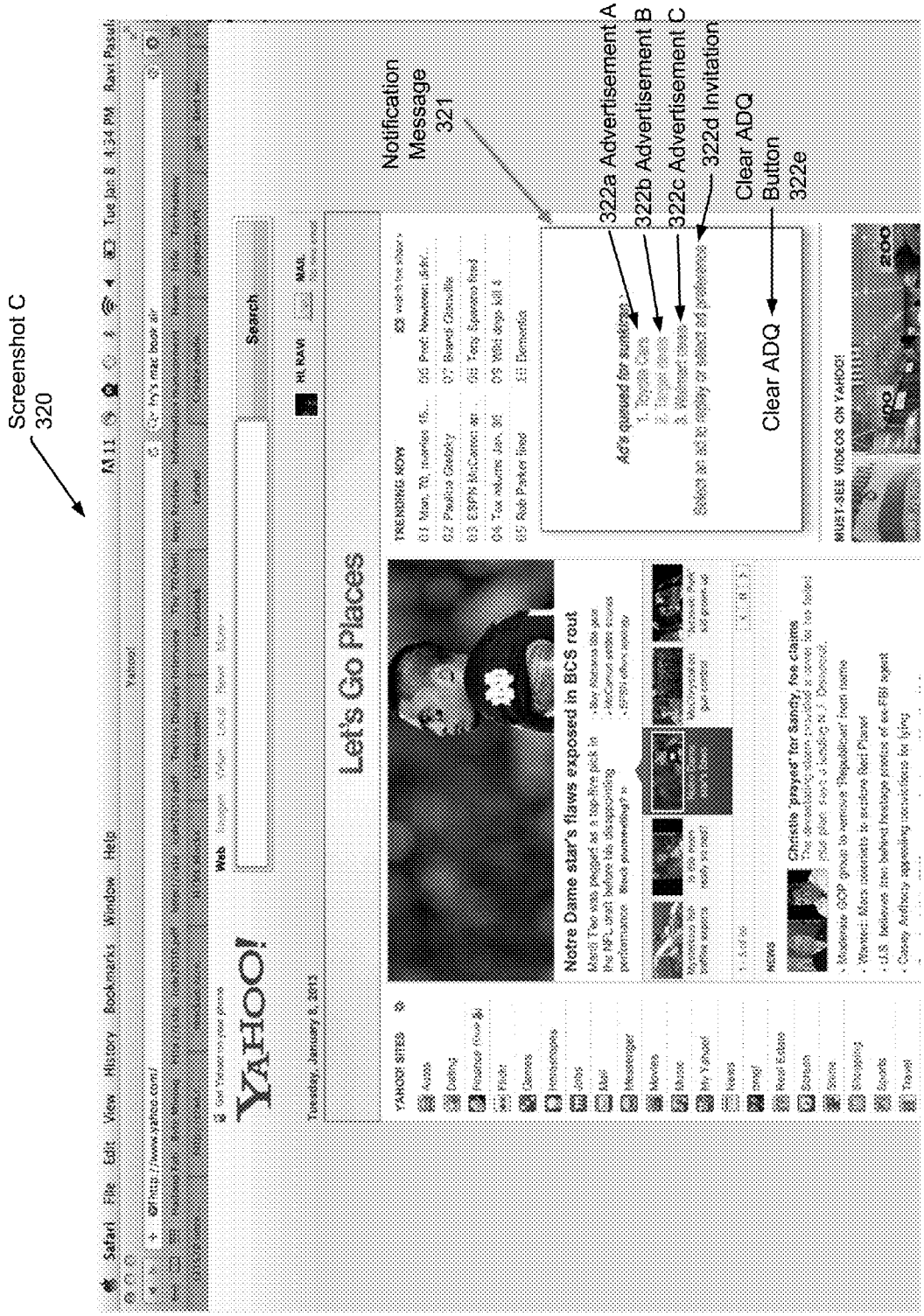

FIG. 3C shows a screenshot C (320) of the webpage shown in FIGS. 3A and 3B after the user activates several advertisement queuing action buttons such that the advertisement queue assigned to the user by the advertisement queuing service provider is now full. In another scenario, the user may have requested to view the content of the advertisement queue by clicking/mouse-over the queuing message (311) shown in FIG. 3B.

As shown in FIG. 3C, the advertisement icon A (301a) and the action button A (302a) shown in FIG. 3A, as well as the queuing message (311) shown in FIG. 3B are now replaced by the notification message (321) showing all of the advertisements that have been queued for the user. For example, the user has previously selected the advertisement A (322a), advertisement B (322b), and advertisement C (322c) to be queued. In addition, the notification message (321) also includes the invitation (322d) inviting the user to select a queued advertisement for viewing, or to select a preferred advertisement category for viewing. Upon the user selecting (e.g., clicking) one of the advertisement A (322a), advertisement B (322b), and advertisement C (322c), the selected advertisement is presented (e.g., displayed, played back as an audio message, etc.) to the user. Alternatively, the user may request to select the preferred advertisement category for viewing by clicking on the invitation (322d) itself. Further, the user may simply click on the clear ADQ button (322e) to clear all queued advertisements without viewing any of them. As noted above, the advertiser may be charged a fee upon the user selecting at least one advertisement for viewing.

Figure 3D:
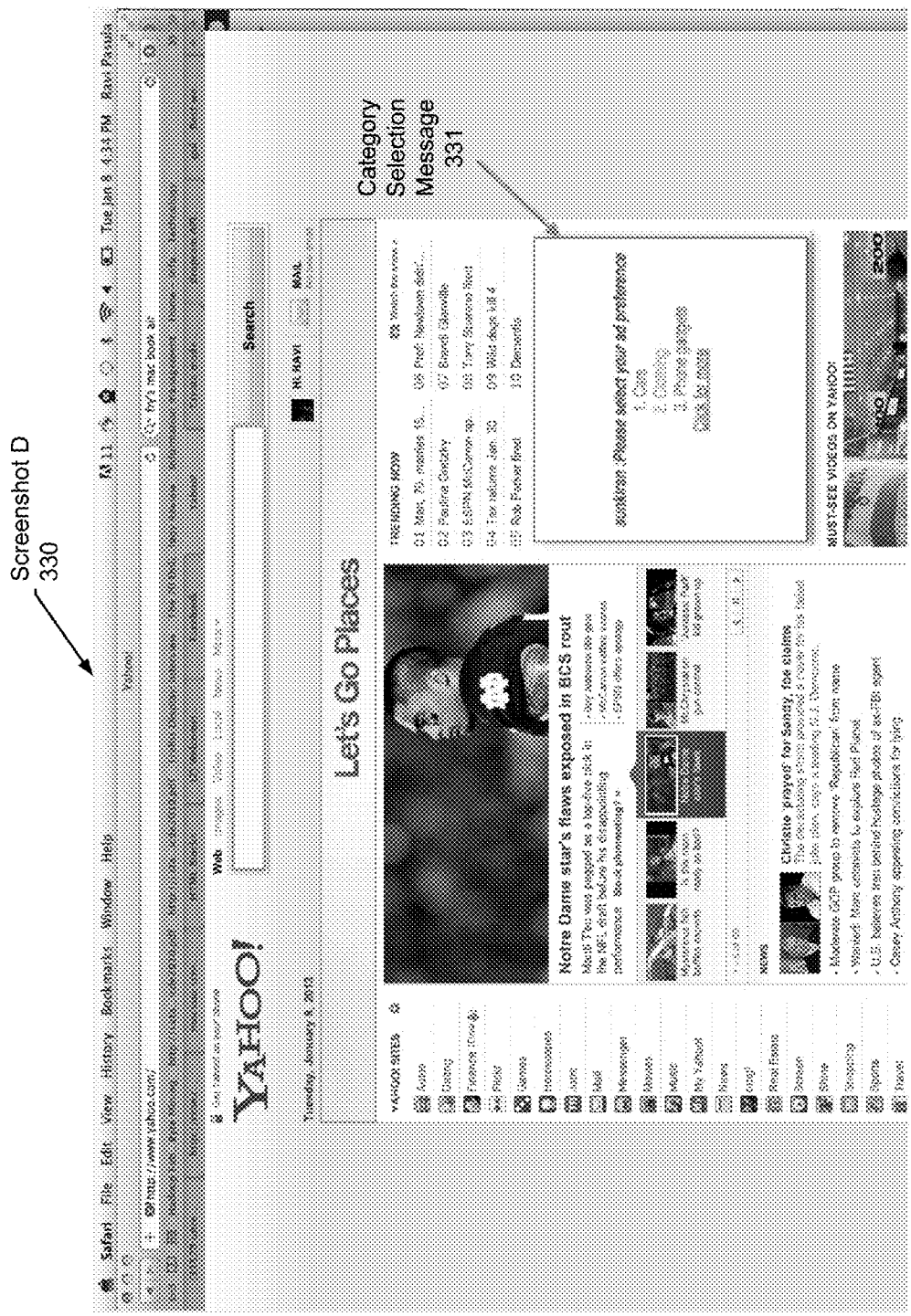

FIG. 3D shows a screenshot D (330) of the webpage shown in FIGS. 3A, 3B, and 3C after the user clicking on the invitation (322d) to select the preferred advertisement category for viewing. As shown in FIG. 3D, the advertisement icon A (301a) and the action button A (302a) shown in FIG. 3A, the queuing message (311) shown in FIG. 3B, as well as the notification message (321) shown in FIG. 3C are now replaced by the category selection message (331) showing advertisement categories that the user may select for viewing. For example, the user may select the clothing category. The queued advertisements in the clothing category are then presented to the user for viewing. Other queued advertisements in different categories may be discarded or presented to the user after the user completes the viewing of the clothing category advertisements. At any point of viewing the queued advertisements, the user may cancel the viewing. For example, the user may only view (either once or repeat multiple times) one advertisement to completion, view all queued advertisements sequentially to completion, or view a portion of queued advertisements in any viewing pattern. As noted above, the fee charged to the advertiser is dependent on the user viewing pattern. In addition, the selected preferred category and the viewing pattern may be stored in a user profile, which may be used for target marketing analysis. For example, if the user views all queued advertisement in a row indicating a casual viewing behavior, the advertiser is charged a lower rate. In contrast, the advertiser is charged a higher rate when the user selects a single advertisement to view and/or setting the category of the selected advertisement as a preferred category.

Figure 4:
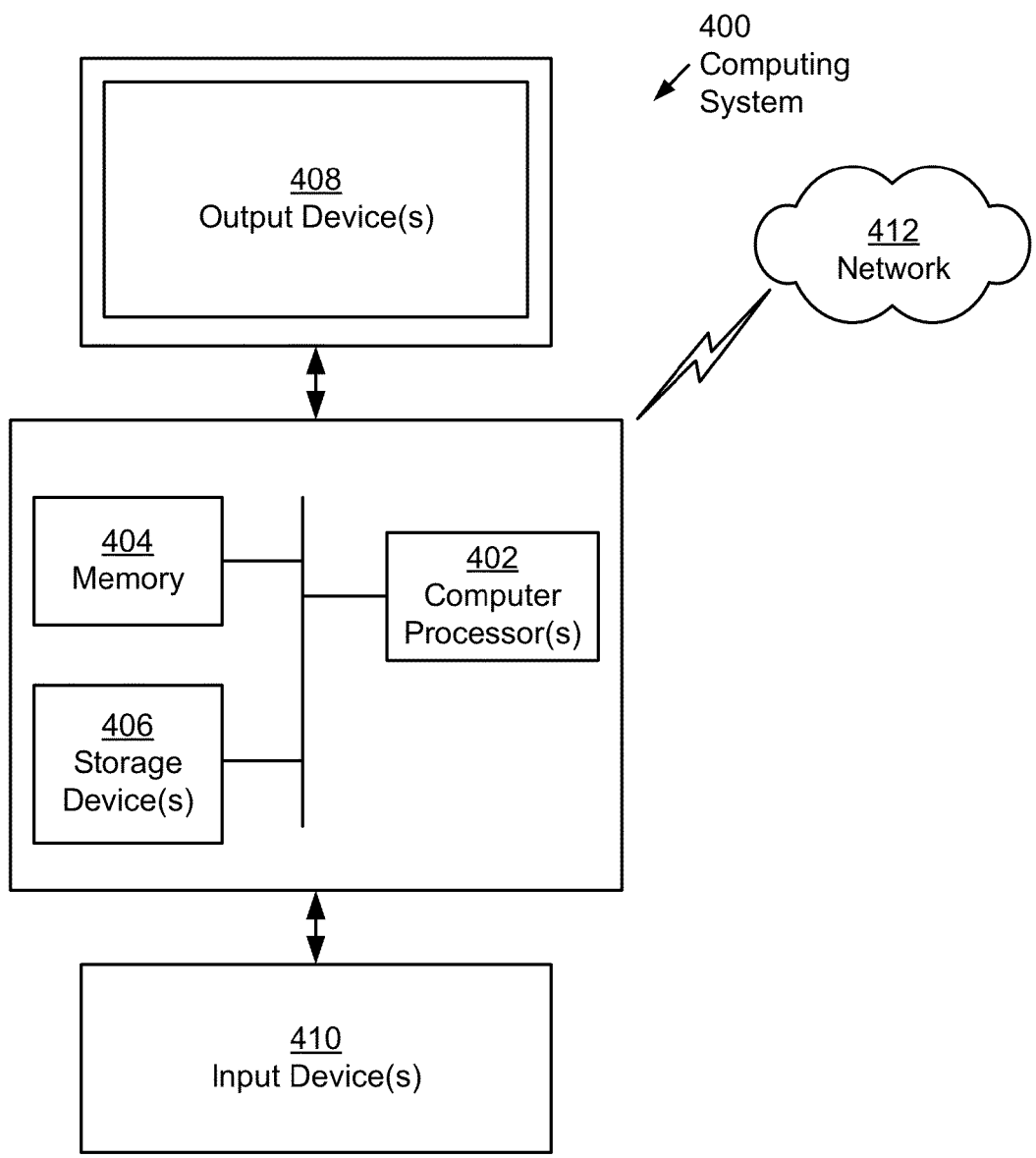
FIG. 4 shows a diagram of a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to present advertisements, comprising:
   identifying a first user queuing selection of a first advertisement, wherein the first user queuing selection is made by a user while viewing, on a user device, a first webpage comprising a first icon representing media content, the first advertisement and a first advertisement queue (ADQ) button annotating the first icon;
   identifying, subsequent to queuing the first advertisement in an ADQ assigned to the user, a second user queuing selection of a second advertisement, wherein the second user queuing selection is made by the user while viewing, on the user device, a second webpage comprising a second icon representing the second advertisement and a second ADQ button annotating the second icon;
   queuing, by a computer processor and in response to the first user queuing selection, the first advertisement in the ADQ;
   queuing, by the computer processor and in response to the second user queuing selection, the second advertisement in the ADQ;
   detecting, in response to queuing the second advertisement in the ADQ, the ADQ reaching a pre-determined full-status;

presenting, in response to detecting the ADQ reaching the pre-determined full-status, a notification to the user inviting the user to view one or more advertisements queued in the ADQ;

identifying, in response to detecting the ADQ reaching the pre-determined full-status and presenting the notification, a user viewing selection to select, from the ADQ, the first advertisement for viewing;

sending, by the computer processor and in response to the user viewing selection, an advertisement presentation request to present the first advertisement on the user device, wherein the advertisement presentation request requires payment of an advertising fee by an advertiser; and identifying, in response to detecting the ADQ reaching the pre-determined full-status and presenting the notification, a user clearing selection to clear, from the ADQ, the second advertisement, wherein the second advertisement is prevented from being presented to the user.

2. The method of claim 1, further comprising:
detecting a viewing pattern of the user viewing the one or more advertisements queued in the ADQ,
wherein the advertising fee is determined based on the viewing pattern.

3. The method of claim 1, further comprising:
receiving a preferred advertisement category from the user; and
generating, based on the preferred advertisement category, a ranking of at least the one or more advertisements queued in the ADQ,
wherein the first advertisement is presented to the user at least based on the ranking.

4. The method of claim 1,
wherein the first user queuing selection and the user viewing selection are associated with a user identifier of the user and an advertisement identifier of the first advertisement, and
wherein queuing the first advertisement in the ADQ assigned to the user comprises:
identifying the ADQ based on the user identifier; and
storing the advertisement identifier in the ADQ.

5. The method of claim 1, further comprising:
receiving, from the advertiser of the first advertisement, a subscription to an ADQ service; and
sending, to an advertisement server and in response to the subscription, an ADQ service request identifying the first advertisement,
wherein the first icon representing the first advertisement is presented to the user on the user device in response to the advertisement server processing the ADQ service request.

6. A system to present advertisements, comprising:
a computer processor;
a content server comprising the computer processor and configured to provide online content for user viewing;
a user device coupled to the content server and configured to retrieve the online content for presenting to a user, wherein the user device comprises an advertisement queue (ADQ) agent, executing as instructions on the computer processor, configured to:
identify a first user queuing selection of a first advertisement, wherein the first user queuing selection is made by the user while viewing, on the user device, a first webpage comprising a first icon representing the first advertisement and a first ADQ button annotating the first icon;

identify, subsequent to queuing the first advertisement in an ADQ assigned to the user, a second user queuing selection of a second advertisement, wherein the second user queuing selection is made by the user while viewing, on the user device, a second webpage comprising a second icon representing the second advertisement and a second ADQ button annotating the second icon;

present, in response to the ADQ reaching a pre-determined full-status, a notification to the user inviting the user to view one or more advertisements queued in the ADQ;

identify, in response to presenting the notification, a user viewing selection of the user to select, from the ADQ, the first advertisement for viewing; and identify, in response to detecting the ADQ reaching the pre-determined full-status and presenting the notification, a user clearing selection to clear, from the ADQ, the second advertisement, wherein the second advertisement is prevented from being presented to the user; and an ADQ server comprising:
an ADQ manager, executing as instructions on the computer processor, configured to:
queue, in response to the first user queuing selection, the first advertisement in the ADQ;
queue, in response to the second user queuing selection, the second advertisement in the ADQ;
detect, in response to queuing the second advertisement in the ADQ, the ADQ reaching the pre-determined full-status; and
send, in response to the user viewing selection, an advertisement presentation request to an advertisement server to present the first advertisement to the user on the user device; and
a repository for storing the ADQ;

wherein the advertisement server comprises the computer processor and is configured to receive the advertisement presentation request and present the first advertisement, and wherein the advertisement presentation request requires payment of an advertising fee by an advertiser.

7. The system of claim 6, wherein the ADQ manager is further configured to:
detect a viewing pattern of the user viewing the one or more advertisements queued in the ADQ,
wherein the advertising fee is determined based on the viewing pattern.

8. The system of claim 6, wherein the ADQ manager is further configured to:
receive a preferred advertisement category of the user; and
generate, based on the preferred advertisement category, a ranking of at least the one or more advertisements queued in the ADQ,
wherein the first advertisement is presented to the user at least based on the ranking.

9. The system of claim 6,
wherein the first user queuing selection and the user viewing selection are associated with a user identifier of the user and an advertisement identifier of the advertisement, and
wherein queuing the first advertisement in the ADQ assigned to the user comprises:
identifying the ADQ based on the user identifier; and
storing the advertisement identifier in the ADQ.

10. The system of claim 6,
wherein the ADQ manager is further configured to:
  receive, from the advertiser of the first advertisement, a subscription to ADQ service; and
  send, to the advertisement server and in response to the subscription, an ADQ service request identifying the first advertisement,
wherein the advertisement server is configured to communicate with the content server and cause the content server to:
  insert, in response to the ADQ service request, the first icon in the first webpage retrieved by the user using the user device from the content server; and
  insert, in response to the advertisement presentation request, the first advertisement in the first webpage.

11. The system of claim 6, wherein the ADQ agent is downloaded from the advertisement server to execute on the user device.

12. The system of claim 11, wherein the ADQ server and the advertisement server are integrated.

13. A non-transitory computer readable medium storing instructions to present advertisements, the instructions, when executed by a computer processor, comprising functionality for:
  identifying a first user queuing selection of a first advertisement, wherein the first user queuing selection is made by a user while viewing, on a user device, a first webpage comprising a first icon representing the first advertisement and a first ADQ button annotating the first icon;
  identifying, subsequent to queuing the first advertisement in an ADQ assigned to the user, a second user queuing selection of a second advertisement, wherein the second user queuing selection is made by the user while viewing, on the user device, a second webpage comprising a second icon representing the second advertisement and a second ADQ button annotating the second icon;
  queuing, in response to the first user queuing selection, the first advertisement in the ADQ;
  queuing, in response to the second user queuing selection, the second advertisement in the ADQ;
  detecting, in response to queuing the second advertisement in the ADQ, the ADQ reaching a pre-determined full-status;
  presenting, in response to detecting the ADQ reaching the pre-determined full-status, a notification to the user inviting the user to view one or more advertisements queued in the ADQ;
  identifying, in response to presenting the notification, a user viewing selection to select, from the ADQ, the first advertisement for viewing;
  sending, in response to the user viewing selection, an advertisement presentation request to present the first advertisement on the user device,
    wherein the advertisement presentation request requires payment of an advertising fee by an advertiser; and
  identifying, in response to presenting the notification, a user clearing selection to clear, from the ADQ, the second advertisement,
    wherein the second advertisement is prevented from being presented to the user.

14. The non-transitory computer readable medium of claim 13, the instructions, when executed by the computer processor further comprising functionality for:
  detecting a viewing pattern of the user viewing the one or more advertisements queued in the ADQ,
  wherein the advertising fee is determined based on the viewing pattern.

15. The non-transitory computer readable medium of claim 13, the instructions, when executed by the computer processor further comprising functionality for:
  receiving a preferred advertisement category from the user; and
  generating, based on the preferred advertisement category, a ranking of at least the one or more advertisements queued in the ADQ,
  wherein the first advertisement is presented to the user at least based on the ranking.

16. The non-transitory computer readable medium of claim 13,
  wherein the first user queuing selection and the user viewing selection are associated with a user identifier of the user and an advertisement identifier of the first advertisement, and
  wherein queuing the first advertisement in the ADQ assigned to the user comprises:
    identifying the ADQ based on the user identifier; and
    storing the advertisement identifier in the ADQ.

17. The non-transitory computer readable medium of claim 13, the instructions, when executed by the computer processor further comprising functionality for:
  receiving, from the advertiser of the first advertisement, a subscription to an ADQ service; and
  sending, to an advertisement server and in response to the subscription, an ADQ service request identifying the first advertisement,
  wherein the first icon representing the first advertisement is presented to the user on the user device in response to the advertisement server processing the ADQ service request.

* * * * *